United States Patent [19]

Tatterson et al.

[11] 3,731,361
[45] May 8, 1973

[54] APPARATUS FOR INSTALLING IN OR REMOVING AN INSERT FROM A PIPE CARRYING FLUID UNDER PRESSURE

[75] Inventors: Benjamin F. Tatterson, Pittsburgh; Ward F. Gidick, West Newton, both of Pa.

[73] Assignee: Koppers Company, Inc., Pittsburgh, Pa.

[22] Filed: Nov. 10, 1971

[21] Appl. No.: 197,320

[52] U.S. Cl.....................29/200 D, 29/200 P, 29/401
[51] Int. Cl..........................B23p 19/00, B22d 19/10
[58] Field of Search...............................138/94, 94.3; 29/200 R, 200 D, 200 P, 401

[56] References Cited
UNITED STATES PATENTS 2,349,889  5/1944  Steudel..............................29/401 X

*Primary Examiner*—Thomas H. Eager
*Attorney*—Sherman H. Barber et al.

[57] ABSTRACT

First and second cooperating enclosures surround a flanged joint in a conduit with means coacting with the enclosures and with the conduit to make the enclosure gas tight. An insert movably supported in the first enclosure is movable into position between the flanges when they are separated. Means is provided to separate the flanged joint and such means is also available to move the flange toward each other and into contact with the insert.

6 Claims, 5 Drawing Figures 3,731,361

APPARATUS FOR INSTALLING IN OR REMOVING AN INSERT FROM A PIPE CARRYING FLUID UNDER PRESSURE

BACKGROUND OF THE INVENTION

This invention relates to apparatus for inserting in and removing an insert such as a slip blank or a slip ring from between the flanges of a pipe line carrying gaseous fluid under pressure.

During plant expansion and plant maintenance programs, it is often necessary to extend or replace existing pipe lines which carry gaseous fluids under pressure and which must remain in continuous service.

Heretofore, it has been customary to provide a temporary parallel pipe line or pipe line section with connections for connecting the discharge pipe line from the operating equipment. When the step in the program was reached where a change-over would be made, the pumps or blowers producing the positive presser were shut down and the pipe line was purged free of combustible gas.

After the pipe line was purged, the existing pipe line, or a section thereof, was removed and the connecting pipe line was connected from the equipment to the new line or lines. This pipe line was then repurged to remove any air in it before the pumps or blowers were started again.

During the period of time that the pumps or blowers were shut down, the gas produced was bled to the atmosphere at some place through a bleeder or other relief device. In many instances, the gas that was bled was either poisonous or dirty or both, and the atmosphere or surrounding terrain or both was polluted during such change-over and purging period.

In some instances, blanks and/or slip rings would have to be inserted in gas pipe lines operating under a positive pressure. This involved removing bolts, spreading apart flanges, and inserting a slip blank or slip ring, during which procedure gas escaped to the atmosphere. This procedure was and is considered to be very hazardous, and oftentimes dangerous fires or asphyxiation of workmen resulted. The use of suitable gas masks by workmen may remove the asphyxiation problem to a great extent, but there is still the ever present danger of a serious fire if a workman accidentally produced a spark that could ignite the gas.

Responsible contractors usually do not recommend and perform such change-over procedures. And so, if the plant operator wishes to avoid the shutdown and purging procedure, he has to install a slip blank or slip ring using plant personnel. The hazard, however, is not overcome.

SUMMARY OF THE INVENTION

Apparatus for installing in or removing an insert, such as a slip blank or a slip ring, from a bolted flanged joint includes means for urging the flanges of the joint into contact while the bolts in the flange are removed. A gas-tight enclosure surrounds the joint and the enclosure contains the insert. Means is provided to position the insert in alignment with the space between the flanges when they are moved apart to admit the insert. Means is provided to move the insert into position between the flanges and a guideway is provided in the enclosure to accomplish this positioning.

After the insert is set in position, the flanges are moved into contact with the insert and held in such position. The enclosure is then removed and the bolts replaced in the flange holes and retightened.

Apparatus for removing such slip blank or slip ring includes additionally a cover on the enclosure and a lifting mechanism that is connectable to the blank or ring for raising and removing such blank or ring when the flanges are separated.

BRIEF DESCRIPTION OF THE DRAWING

In the drawing:

FIG. 3 is a view along line III—III of FIG. 2;

FIG. 4 is a view along line IV—IV of FIG. 2; and

FIG. 5 is a view along line V—V of FIG. 4.

DETAILED DESCRIPTION

Figure 1:
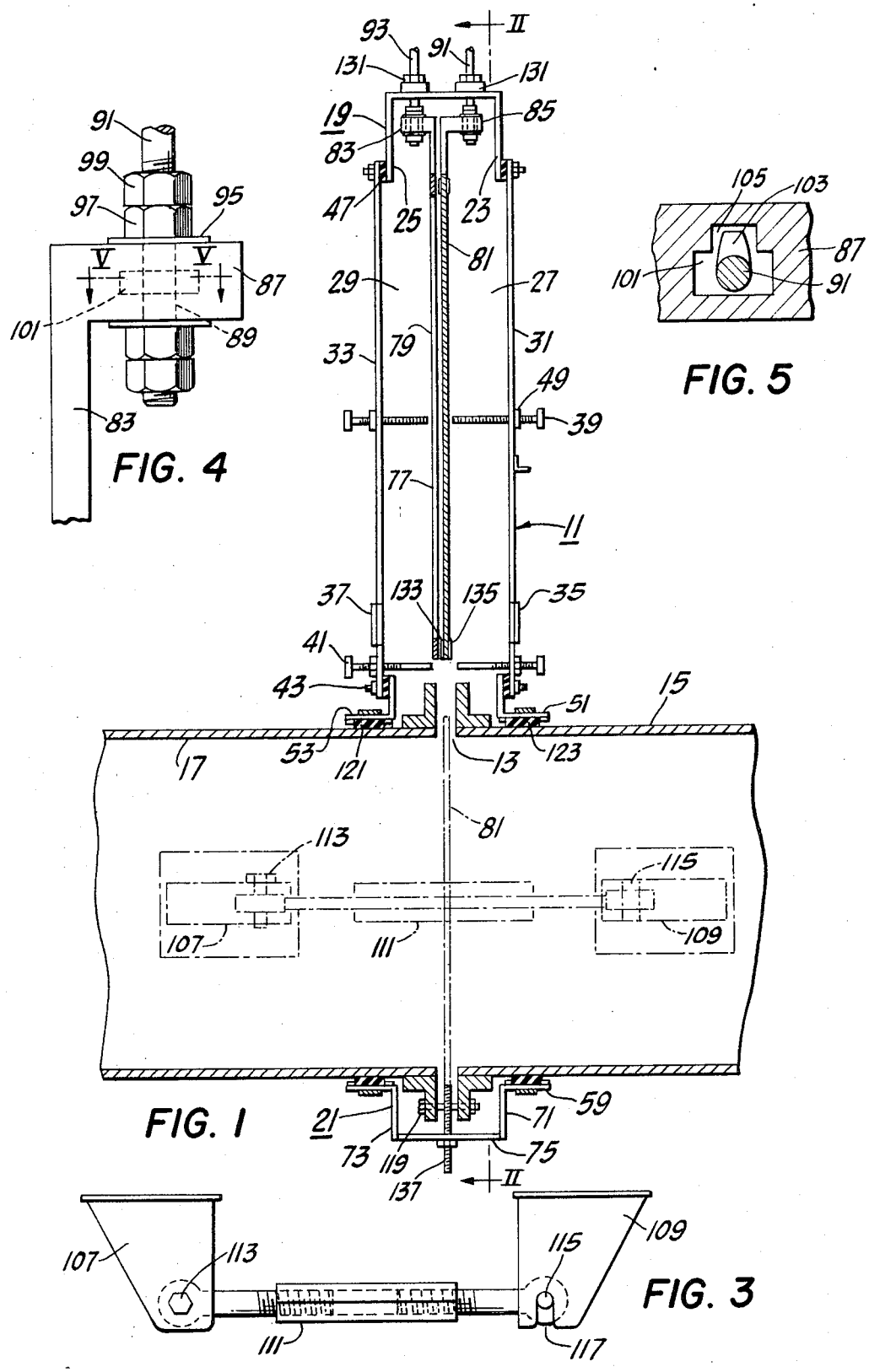
FIG. 1 is a schematic sectional view of apparatus in accordance with the invention installed in an operative position.

FIG. 1 illustrates apparatus 11 in accordance with the invention, showing it installed in an operative position at a bolted flanged joint 13 connecting lengths of pipe 15, 17 carrying fluid, particularly a gaseous fluid, at superatmospheric pressure.

The apparatus 11 includes an upper first gas-tight enclosure 19 and a connecting lower second gas-tight enclosure 21. The upper first gas-tight enclosure 19 comprises spaced apart front and rear panels 23, 25, respectively, and connecting intermediary side and top plates 26, 28. The front and rear panels 23, 25 each have a large circular opening 27, 29, respectively, that is covered by suitable cover plates 31, 33 in each of which there is an inspection window 35, 37. Each cover plate 31, 33 is also provided with a plurality of alignment screws 39, 41, located about where shown, for a purpose that will be explained hereinafter. The cover plates 31, 33 are removably secured to their respective panels 23, 25 by means of nuts 45 threaded on studs 43. Cap screws may, of course, be used instead of the studs 43 and nuts 45 if preferred. A suitable gasket 47 is disposed between each cover plate 31, 33 and its respective panel 23, 25 to provide a gas-tight joint. Each alignment screw 39, 41 comprises a threaded cap screw of conventional form which cooperates with a threaded packing gland 49.

Figure 2:
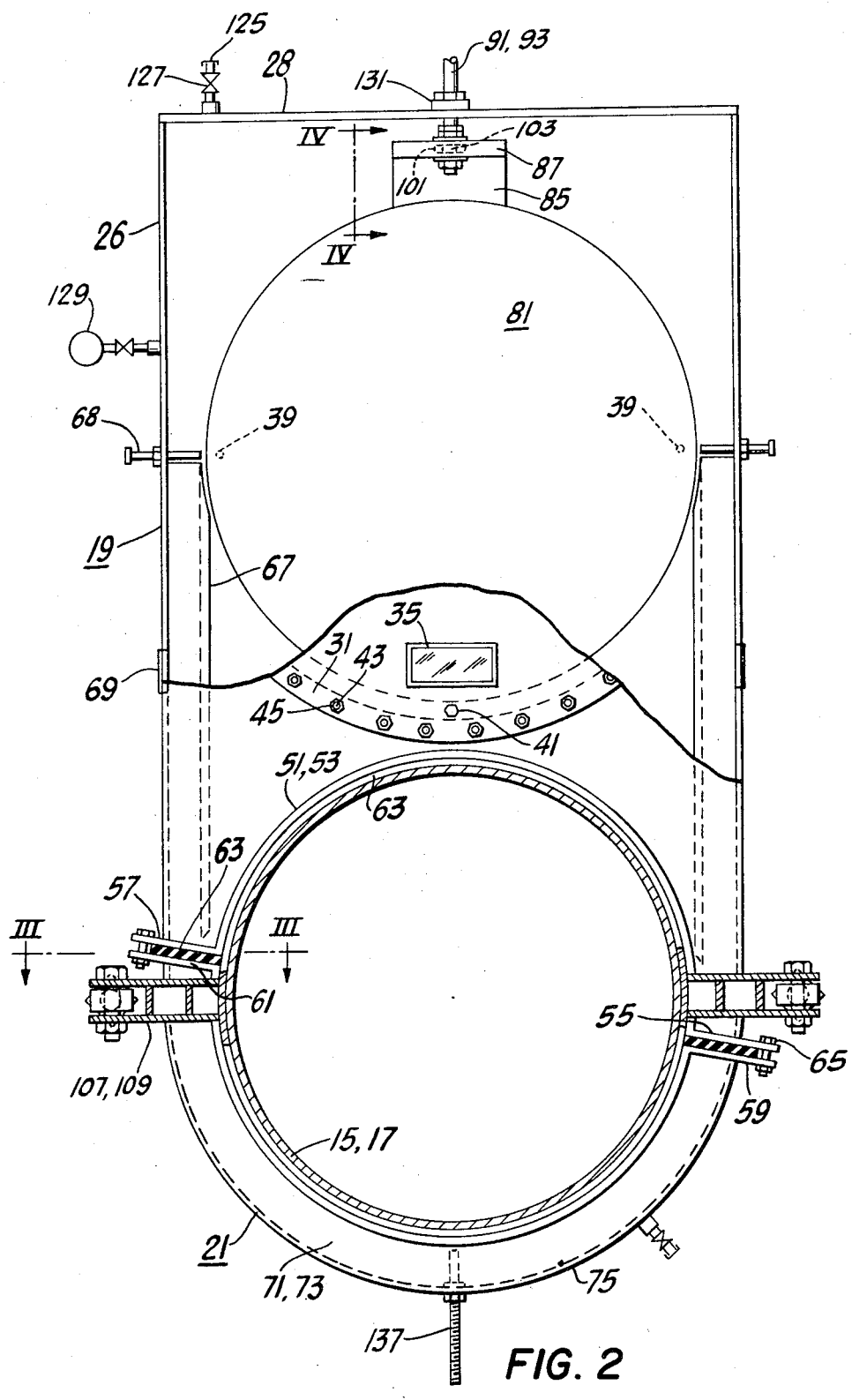
FIG. 2 is a view along line II—II of FIG. 1.

The front and rear panels 23, 25 are each fitted with a flange 51, 53, respectively, which is arcuate in shape, as shown in FIG. 2, so as to fit neatly around the pipe sections 15, 17. As may be noticed from FIG. 2 also, each flange 51, 53 and the side plates 26 connect to joining flanges 55, 57 which are disposed in juxtaposed relation to other joining flanges 59, 61 that are associated with the lower second gas-tight enclosure 21.

Suitable packing or gasket material 63, such as rubber, is disposed between the flanges 51, 53 and the outer surfaces of the pipe sections 15, 17 and also between the juxtaposed flanges 55, 59 and 57, 61. Conventional bolts and nuts 65 connect together the juxtaposed flanges.

Each side plate 26 is fitted internally with oppositely disposed channel-shaped guideways 67 having a length and being located about as shown in FIG. 2. The purpose of such guideways 67 will be explained hereinafter.

Each of the two side plates 26 also is fitted with an alignment screw 68 which is arranged in a vertical plane that is parallel to the front and rear panels 23, 25 and which coacts with internal structure in a manner described hereinafter.

In like manner, each of the two side plates 26 is fitted with an inspection window 69 like the inspection window 35, and such inspection window 69 is located about where shown in FIG. 2.

The lower second gas-tight enclosure 21 is generally semi-cicular in shape and has front and rear panels 71, 73 with an intermediary wall 75 connecting both panels as shown. The front and rear panels 71, 73 and the intermediary wall 75 merge with the flange 59 which has been described previously as being juxtaposed toward the flange 55 and which is coactive therewith through bolts 65.

Within the upper first gas-tight enclosure 19 there are two inserts. One insert is an annular slip ring 77, having a large central opening 79, and the other insert is a solid plate disc 81 or slip blank. To the top position of the slip ring 77 and the plate disc 81 there are attached, respectively, angle-shaped members 83, 85, and each such angle-shaped member has a relatively thick flange 87.

Each flange is pierced with a hole 89 through which the lower threaded portion of an elongate rod 91 extends; rod 91 extending through flange 87 of angle-shaped member 85 and another similar rod 93 extending through flange 87 of angle-shaped member 83.

The lower threaded portion of each rod 91, 93 is fitted with a washer 95 and a pair of coacting nuts 97, 99 both above and below the thick flange 87, as shown in FIG. 4; the nuts 99 being lock or jamb nuts. The rods 91, 93, however, are free to rotate axially relative to the thick flange 87.

From FIGS. 4 and 5 it will be noted that the thick flange 87 has an internal cavity 101, and that a cam 103, fixed to the rod 91, is disposed in the cavity 101. The walls of the cavity 101 are shaped to provide a recess 105 in which the cam 103 operates; the cam being cooperative with the side walls of the recess 105 in a manner and for a purpose described hereinafter. A similar cavity and cam attached to rod 93 are provided but not shown.

The apparatus shown and described so far herein is used in the following manner whenever it is necessary for workmen to insert into or remove a slip blank such as disc 81 or slip ring such as the annular disc 77 from a pipe line operating under pressure.

Initially, two pairs of flanged lugs 107, 109, shown in FIG. 3, are welded to the external surface of pipes 15, 17, respectively, at the location shown in FIGS. 1 and 2. The pairs of lugs 107, 109 are located diametrically opposite each other. A conventional turnbuckle 111 is connected at one end to a pin 113 in lug 107 and to another pin 115 that cooperates with a slot 117 in the lug 109. Turnbuckles 111 are tightened to hold the flanges tight to prevent leakage while flange bolts 119 in the upper half are removed, and while the flange bolts 119 in the lower half are loosened.

Heavy compressible gaskets 121, 123 of rubber or other suitable material are wrapped around the outside of the pipes 15, 17 in areas which have been suitably lubricated so that the pipes can move relative to the apparatus 11. Then, the gas-tight upper 19 and lower 21 enclosures are placed in position, as shown in FIG. 1, and the bolts 65 are tightened. The slip blank 81 is inside the apparatus 11 where shown in FIG. 1.

It is desirable now to test the gas-tightness of the apparatus 11. To do this, an inert gas under pressure is introduced into the apparatus 11 through a conduit 125 and stop valve 127. Pressure within the apparatus 11 is noted on a gauge 129. If the gas-tightness is satisfactory, as indicated by no substantial drop in pressure on the gauge 129, the turnbuckles 111 are turned to exert compression forces on the lugs 107, 109 thereby spreading apart the flanges.

If the slip blank 81 is not aligned with the space between the spread-apart flanges, the rod 91 may be turned axially by means of a suitable tool so that the cam 103 urges the heavy flange 87 laterally, as viewed in FIG. 1, until the slip blank 81 is in line with the space. The alignment may be observed through the observation windows 69.

Thereafter, the rod 91 is moved downwardly through a conventional packing gland 131. Alignment screws 41 are used to move the slip blank 81 in the direction of the space between the spread-apart flanges should the slip blank not be in vertical alignment therewith.

If there is a gasket between the flanges of the pipes 15, 17, it is desirable to remove the gasket by first moving the slip ring 77 in like manner into position and then down between the flanges. The slip ring 77 is moved into position above the spread-apart flanges by rotating the rod 93, as rod 91 is rotated, and by lowering the rod 93. Then, the slip ring 77 is withdrawn and rod 93 is rotated to move the slip ring out of position.

The pipe flanges are now spread further apart by turning the turnbuckle 111 so that the slip blank 81 can be lowered between the flanges without damaging annular sealing gaskets 133 and 135 on opposite sides of the slip blank 81.

The slip blank 81 is lowered into position between the pipe flanges until the lower peripheral edge of the slip blank contacts a threaded drift pin 137, which projects into the interior of the lower enclosure 21 about as shown in FIGS. 1 and 2. In FIG. 2 the slip blank 81 is shown in dotted outline in the installed position between the pipe flanges.

After the slip blank is in position between the pipe flanges, the turnbuckles 111 are oppoitely turned to move the spread-apart pipe flanges toward and into contact with the slip blank. Then the enclosure of 11 is again pressurized through valve 127 and the adequacy of the seal is observed by watching the pressure gauge 129.

If the seal is satisfactory, the apparatus 11 is removed. First, after bleeding the pressure from the apparatus, one of the cover plates 31 or 33 is removed so that access is available to remove the angle-shaped member from the slip blank by means of a cutting tool. Then, the upper enclosure may be separated from the lower enclosure, and both enclosures may be removed from the pipe, allowing a workman to reinstall and tighten the flange bolts.

Thereafter, the turnbuckles 111 and lugs 107, 109 can be removed or left in place, if the slip blank is to be removed at a later time.

From the foregoing description of one embodiment of the invention, those skilled in the art should recognize many important features and advantages of it, among which the following are particularly significant:

That the apparatus of the invention can readily be used to either install or remove inserts such as slip blanks or slip rings in gas pipes under a positive pressure;

That the apparatus of the invention eliminates the hazardous condition now present when an insert such as a blank or slip ring is installed in or removed from such a pipe line carrying gas under pressure; and That the apparatus of the invention is relatively simple to construct and use, easy to maintain, and not costly to manufacture.

Although the invention has been described herein with a certain degree of particularlity, it is understood that the present disclosure has been made only as an example and that the scope of the invention is defined by what is hereinafter claimed.

What is claimed is:

1. Apparatus for installing and removing an insert from a flanged joint of a pipe carrying gas under positive pressure comprising:
    a. a first enclosure partially surrounding said flanged joint;
    b. a second enclosure surrounding the remainder of said flanged joint and cooperating with said first enclosure;
    c. means cooperating with said first and second enclosures and with said pipe for making said enclosures gas tight;
    d. an insert movably supported in said first enclosure in position to move toward said flanged joint;
    e. means for spreading apart the flanges of said flanged joint;
    f. means for moving said insert into an aligned position with the space between said flanges;
    g. means for moving said insert into position between said flanges; and
    h. means for moving said flanges toward each other and into contact with said insert.

2. The apparatus of claim 1 wherein:
    a. said insert is connected to means for raising and lowering said insert relative to said enclosure; and including
    b. at least one adjustable screw extending into said first enclosure for guiding said insert as it moves.

3. The apparatus of claim 2 including:
    a. an opening in said first enclosure;
    b. a removable cover over said opening;
    c. a guideway within said first enclosure for cooperating with said insert to maintain it in a preselected path of travel.

4. The apparatus of claim 1 wherein:
    a. said means for moving said insert includes a rod passing through a gland in said first enclosure and connected to said insert; and wherein
    b. said means for moving said insert into position includes:
        i. a cam mounted to said rod that is rotatable about an axis and engageable with said insert.

5. Apparatus for installing and removing an insert from a flanged joint of a pipe carrying gas under positive pressure comprising:
    a. a first enclosure partially surrounding said flanged joint of said pipe;
    b. a second enclosure surrounding the remainder of said flanged joint and cooperating with said first enclosure;
    c. gasket means cooperating with said first and second enclosures and with said pipe for making said enclosures gas-tight;
    d. an insert movably suspended in said first enclosure in position to gravitate toward said flanged joint;
    e. jacking means for spreading apart the flanges of said flanged joint;
    f. a rod passing through a gland in said first enclosure that is connected to said insert for raising and lowering said insert;
    g. a cam mounted to said rod that cooperates with said insert and moves the same into a preselected position above said spread-apart flanges when said rod is axially turned;
    h. an opening in said first enclosure;
    i. a removable cover over said opening;
    j. at least one adjustable screw extending into said first enclosure for guiding said insert as it moves; and
    k. a guideway in said first enclosure for maintaining said insert in a preselected path of travel.

6. The apparatus of claim 5 including:
    a. a valved conduit communicating with the interior of said enclosure for pressurizing and bleeding fluid from said enclosure.

* * * * *